(12) United States Patent
Stoddard (10) Patent No.: US 10,440,872 B2
(45) Date of Patent: Oct. 15, 2019

(54) ADJUSTABLE HAND TROWEL

(71) Applicant: Bryan John Stoddard, Fullerton, CA (US)

(72) Inventor: Bryan John Stoddard, Fullerton, CA (US)

( * ) Notice: Subject to any disclaimer, the term of this patent is extended or adjusted under 35 U.S.C. 154(b) by 405 days.

(21) Appl. No.: 15/140,020

(22) Filed: Apr. 27, 2016

(65) Prior Publication Data
US 2016/0316608 A1 Nov. 3, 2016

Related U.S. Application Data

(63) Continuation-in-part of application No. 13/847,950, filed on Mar. 20, 2013, now abandoned.

(60) Provisional application No. 61/685,541, filed on Mar. 20, 2012.

(51) Int. Cl.
*A01B 1/02* (2006.01)
*B05C 17/10* (2006.01)
*A01B 1/08* (2006.01)

(52) U.S. Cl.
CPC .............. *A01B 1/08* (2013.01); *A01B 1/02* (2013.01); *A01B 1/022* (2013.01); *B05C 17/10* (2013.01)

(58) Field of Classification Search
CPC .. A01B 1/02; A01B 1/08; A01B 1/022; A47L 13/08
USPC ....................... 15/144.1, 172, 236.01; 30/169
See application file for complete search history.

(56) References Cited

U.S. PATENT DOCUMENTS

| | | | | |
|---|---|---|---|---|
| 220,012 A | * | 9/1879 | Zalinski | A01B 1/022 42/93 |
| 856,575 A | * | 6/1907 | Elliott | A01B 1/02 294/49 |
| 2,495,802 A | * | 1/1950 | Anderson | F23J 1/04 294/181 |
| 4,475,757 A | * | 10/1984 | Glock | A01B 1/022 16/429 |
| 4,920,647 A | * | 5/1990 | Riley | B26B 27/00 15/236.1 |
| 6,460,911 B1 | * | 10/2002 | Engelsiepen | A01B 1/00 294/181 |
| D484,012 S | * | 12/2003 | Pierce | D8/10 |
| 7,032,941 B2 | * | 4/2006 | Heneveld | A01B 1/225 294/51 |
| 8,667,636 B2 | * | 3/2014 | Berney | E04F 21/162 15/105.5 |
| 2007/0271796 A1 | * | 11/2007 | Oikarinen | A47L 13/08 30/169 |

\* cited by examiner

*Primary Examiner* — Randall E Chin
(74) *Attorney, Agent, or Firm* — Hojka Qadeer, LLC; Umair A. Qadeer (57) ABSTRACT

An adjustable hand trowel comprising a handle, a blade-neck assembly comprising a blade and a neck, and an adjustable fastener system is disclosed herein. The adjustable fastener system provides a secure method of fastening the blade-neck assembly to the handle wherein the adjustable hand trowel is able to withstand forces typically exerted when using a trowel for digging and wherein the user may readily dig in confined spaces. The disclosed adjustable hand trowel further allows a user to adjust the relative position of the blade and handle using an adjustable fastener system that may be operated using one hand. The adjustable hand trowel may thereby allow the user to dig in an ergonomic and efficient manner in applications that would otherwise be unsuitable for ergonomic and efficient digging.

8 Claims, 9 Drawing Sheets

ADJUSTABLE HAND TROWEL

CROSS-REFERENCE TO RELATED APPLICATIONS

This application is a continuation-in-part of U.S. Non-Provisional patent application Ser. No. 13/847,950, filed on Mar. 20, 2013, which claims the benefit of and priority to U.S. Provisional Patent Application Ser. No. 61/685,541, filed on Mar. 20, 2012, the disclosures of which are hereby incorporated in their entireties by reference.

BACKGROUND

Field of the Invention

The present disclosure relates to hand tools and more particularly to a novel adjustable hand trowel for digging in soil and other media.

Description of the Related Art

The present disclosure relates to hand tools for digging in soil and other media. A trowel is a hand tool used to dig, move around small amounts of viscous or particulate material, and smooth a surface upon which viscous material has been deposited. Trowels may be used in a variety of applications, including gardening, masonry, archeology, and construction. Trowels used for digging, such as gardening trowels, generally comprise a pointed, scooped-shaped metal blade and a handle. The handle may comprise a soft or shock-absorbing material to reduce stress on the user's hand. The handle is typically mounted in a fixed position behind the blade.

A trowel comprising a handle mounted in a fixed position behind the blade can only be used to dig from behind the area intended for excavation and typically requires a clearance of at least about thirteen (13) inches behind the handle to be used effectively. While trowels with adjustable handles have been previously disclosed, such trowels are not particularly useful for digging on account of, inter alia, the handle rotating in relation to the blade due to the pressure created by digging.

U.S. Pat. Nos. 3,916,472, 3,993,340, 4,475,757, 4,950,013, 5,097,909, 5,450,648, 5,547,240, 5,810,408, 6,027,153, 6,052,857, 6,131,971, 6,315,341, 6,615,928, 6,662,406, 7,284,301, and 7,836,557, U.S. Patent Application Publication No. 2005/0029825, and U.S. Design Pat. Nos. D208,995, D213,014, D254,705, D256,979, D276,405, D292,865, D305,496, D323,271, D353,085, D422,857, D427,031, D459,957, and D549,643 disclose various trowels and other hand tools with features such as adjustable handles or blades, ergonomic designs, and various other features.

There remains a significant need for a trowel with an adjustable handle or blade that is suitable for digging applications.

SUMMARY

The present disclosure describes an adjustable hand trowel that may be used to dig in confined spaces and methods of using the same. The disclosed hand trowel may provide greater leverage while digging and use of the disclosed hand trowel to dig may reduce user soreness and fatigue caused by digging. In some preferred embodiments the handle may be securely mounted in various positions relative to the blade. The adjustable handle allows a user to dig with the blade facing forward or backward, and also allows a user to dig around corners. The adjustable handle minimizes user discomfort while digging at angles that would require awkward hand and arm contortion using an ordinary hand trowel. In addition, the adjustable hand trowel may be configurable for optimal use in a variety digging, shoveling, and dabbing scenarios and may thus be more efficient, natural, and ergonomic. The adjustable hand trowel may be used by a variety of users, including utility workers, painters, electricians, and gardeners.

The disclosed hand trowel may be part of a system used for digging that enables a user in a confined space to comfortably and successfully dig in a suitable medium by securely mounting the handle of the trowel in several positions with respect to the blade.

The disclosed hand trowel may comprise a handle and a blade, wherein the handle may be positioned in at least four configurations, including where the handle is positioned directly behind the blade, where the handle is positioned perpendicular to the blade to the left of the blade, where the handle is positioned perpendicular to the blade to the right of the blade, and where the handle is positioned directly above the blade. The disclosed hand trowel may further comprise a neck, wherein the neck may be attached to the blade to form a blade-neck assembly. The disclosed hand trowel may further comprise an adjustable fastener system that allows a user to readily adjust the position of the handle in relation to the blade. The user may then be able to dig in an area which is directly in front of the user or directly beneath the user, or in an area confined on either or both sides of where the user will dig.

DETAILED DESCRIPTION OF THE PREFERRED EMBODIMENTS

The present disclosure describes an adjustable hand trowel that may be used to dig in confined spaces and methods of using the same. The disclosed hand trowel may provide greater leverage while digging and use of the disclosed hand trowel to dig may reduce user soreness and fatigue caused by digging. In some preferred embodiments the handle may be mounted in various positions relative to the blade. The adjustable handle allows a user to dig with the blade facing forward or backward, and also allows a user to dig around corners. The adjustable handle minimizes user discomfort while digging at angles which would require awkward hand and arm contortion using an ordinary hand trowel. In addition, the adjustable hand trowel may be configurable for optimal use in a variety digging, shoveling, and dabbing scenarios and may thus be more efficient, natural, and ergonomic. The adjustable hand trowel may be used by a variety of users, including utility workers, painters, electricians, and gardeners.

The disclosed hand trowel may be part of a system used for digging that enables a user in a confined space to comfortably and successfully dig in a suitable medium by mounting the handle of the trowel in several positions with respect to the blade.

The disclosed hand trowel may comprise a handle and a blade, wherein the handle may be positioned in at least four configurations, including where the handle is positioned directly behind the blade, where the handle is positioned perpendicular to the blade to the left of the blade, where the handle is positioned perpendicular to the blade to the right of the blade, and where the handle is positioned directly above the blade. The disclosed hand trowel may further comprise a neck, wherein the neck may be attached to the blade to form a blade-neck assembly. The disclosed hand trowel may further comprise an adjustable fastener system that allows a user to readily adjust the position of the handle in relation to the blade. The user may then be able to dig in an area which is directly in front of the user or directly beneath the user, or in an area confined on either or both sides of where the user will dig.

The handle, blade-neck assembly, and adjustable fastener system may be readily separated so that a user may readily replace the blade-neck assembly or handle with another blade-neck assembly or handle more suitable for a particular application.

FIGS. 1-14 illustrate a preferred embodiment of the adjustable hand trowel 60. The embodiments in FIGS. 1-14 comprise a handle 20, a blade 54, a neck 32, and an adjustable fastener system. FIGS. 1-4 illustrate a preferred embodiment of the adjustable hand trowel with the blade positioned in various configurations in relation to the handle.

In some embodiments, the handle may preferably be between 6 and 10 inches in length, and the handle may preferably be contoured to facilitate gripping by the user's hand. In some embodiments, the handle may further comprise a distal thumb seat 24 and a proximal thumb seat 26 for improved user handling. The proximal end of the handle nearest the proximal thumb seat may further comprise a hanging hole 22, wherein the hanging hole may be used to secure the trowel to a hook or peg for storage. The proximal end of the handle may preferably be smooth and rounded and without sharp edges to prevent injury to the user when the trowel is in use.

In some embodiments, the blade may preferably be between 8 and 12 inches in length. In some preferred embodiments, the central portion of the blade may be concave to form a scoop, enabling the blade to hold a volume of material. The distal end of the blade may be tapered to a point to facilitate penetration of the material being dug. The point may be sharp or may be slightly rounded or smoothed for safety or other reasons.

Figure 5:
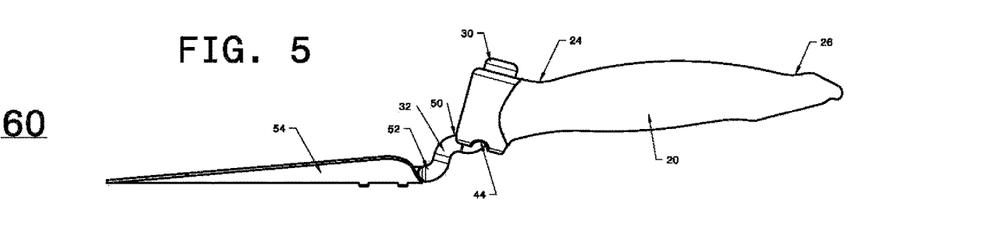
FIG. 5 is a side view of a preferred embodiment where the handle is positioned in line with the blade.

In some preferred embodiments, the proximal end of the blade may be attached to the distal end of the neck to form a blade-neck assembly. The distal end of the neck may be affixed to the proximal end of the blade at a neck seat 52 via an adhesive, a weld, or by other attachment materials known in the art. The central portion of the neck may be configured to incorporate an "S" curve, as shown in FIG. 5. In some preferred embodiments, the neck may further comprise a neck locking ridge 50 to lock the neck into position after adjustment of the handle.

In some preferred embodiments, the neck may be fastened to the distal end of the handle, in close proximity to the distal thumb seat, using the adjustable fastener system.

In some preferred embodiments, the handle and the neck may comprise adjustment elements comprising component elements of the neck and component elements of the handle that interface with the adjustable fastener system to allow the user to readily adjust and secure the blade-neck assembly in various positions in relation to the handle.

Figure 6:
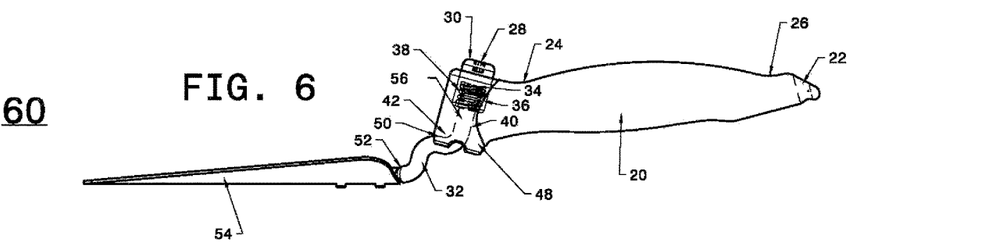
FIG. 6 is a side interior view of a preferred embodiment where the handle is positioned in line with the blade.

In some preferred embodiments, the adjustable fastener system and the adjustment elements of the handle and neck may comprise one or more of the following component parts. The proximal end of the neck may comprise a threaded male extension 34, as shown in FIG. 6. The handle may preferably have an opening near the distal end of the handle, wherein the opening is wider at the top of the handle than it is at the bottom of the handle. The opening may preferably be distal to the distal thumb seat. The opening at the top of the handle may open into an internal chamber 38, and the opening at the bottom of the handle may open into an internal shaft 40. The internal chamber may preferably be approximately cylindrical. The internal shaft may also preferably be approximately cylindrical. The internal chamber and the internal shaft may be directly connected, wherein the opening at the end of the internal chamber that is interior to the handle and the opening at the end of the internal shaft that is interior to the handle are coincident. In some embodiments, the internal shaft may have a smaller diameter than the internal chamber.

Figure 13:
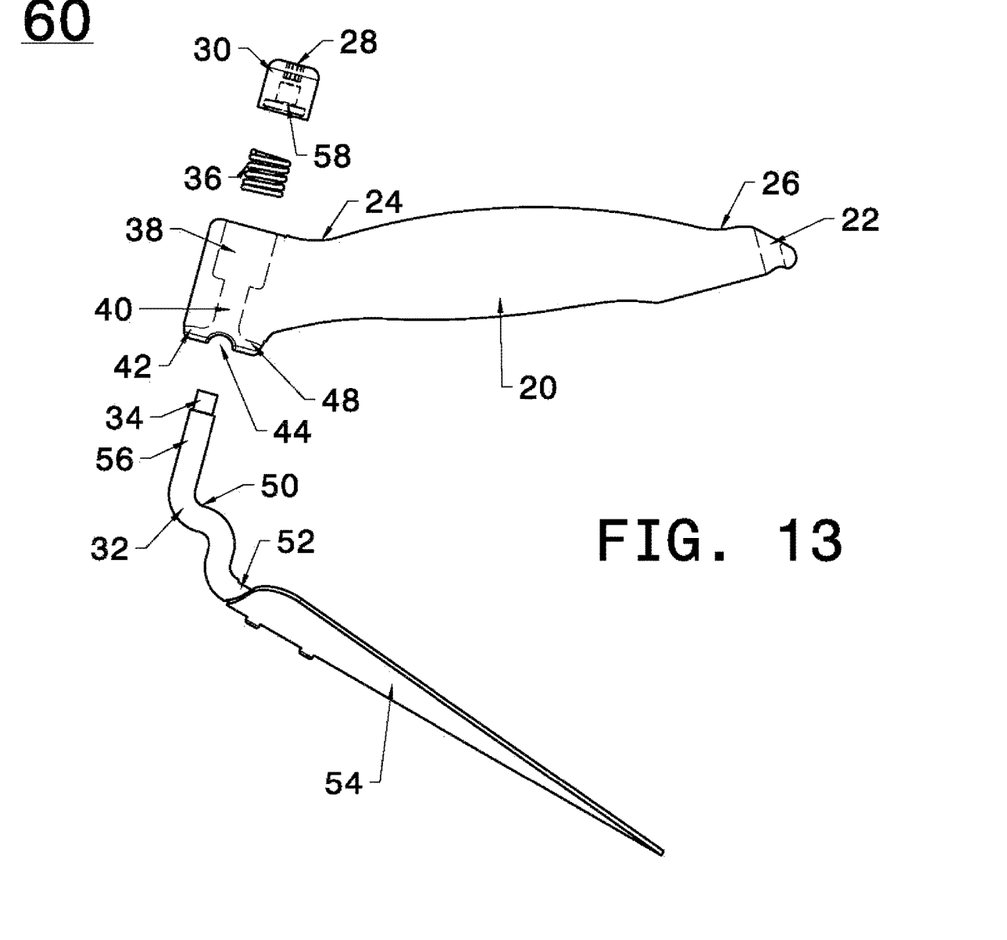
FIG. 13 is an enlarged view of a preferred embodiment.

The threaded male extension of the neck may be inserted into the internal shaft, as shown in FIG. 13. In some embodiments, the threaded male extension may be positioned to extend the entire length of the internal shaft and further extend into the internal chamber.

The adjustable fastener system may comprise an actuator 30. The actuator may comprise an inner part that contacts the neck and an outer part that may be operated by the user. The inner part of the actuator may comprise female threads 58. The threaded male extension of the neck may then be threaded onto the female threads of the inner part of the actuator. In some preferred embodiments, the adjustable fastener system may further comprise a spring 36. In some embodiments, when the handle, blade-neck assembly, and adjustable fastener system are assembled to form the adjustable hand trowel, the spring may contact the proximal end of the threaded male extension, wherein one end of the spring may preferably be positioned at the interior end of the internal chamber and the other end of the spring may preferably contact the end of the inner part of the actuator. The actuator may thus anchor the spring and adjustably secure the blade-neck assembly to the handle. In some preferred embodiments, the outer part of the actuator may further comprise a wrench head 28 that allows the actuator to be tightened onto the threaded male extension of the neck. In such embodiments, the outer part of the actuator may be initially tightened by hand and then further tightened using a wrench or may alternatively be fully tightened by hand.

FIG. 13 illustrates an embodiment of the adjustable fastener system. The neck is anchored to one end to the blade. The neck further comprises an "S" curve that extends from the blade to a neck locking ridge that interfaces with one or more grooves in the handle. The neck locking ridge fits into each groove, and the neck may be locked into place in a desired position. In some preferred embodiments, the angle between the neck locking ridge and the grooves may preferably be between 30 degrees and 90 degrees. The proximal part of the neck, proximal extension 56, extends into the internal shaft of the handle and adopts a straight hinge pin configuration, where the proximal end of the proximal extension comprises a threaded male extension. The threaded male extension extends from the internal shaft into the internal chamber. A spring is positioned in the internal chamber, wherein the spring contacts the threaded male extension. The threaded male extension is then threaded into female threads of the inner part of the actuator. The actuator anchors the spring in place and secures the blade to the handle. The neck is then securely attached to the blade using an adhesive, a weld, or another attachment material known in the art. The neck locking ridge fits into the one or more grooves in the handle. This securely locks the neck to the handle when tension from the spring forces the neck and handle together.

The neck may alternatively be configured in another geometry that allows the neck to be locked to the handle as described herein.

Figure 1:
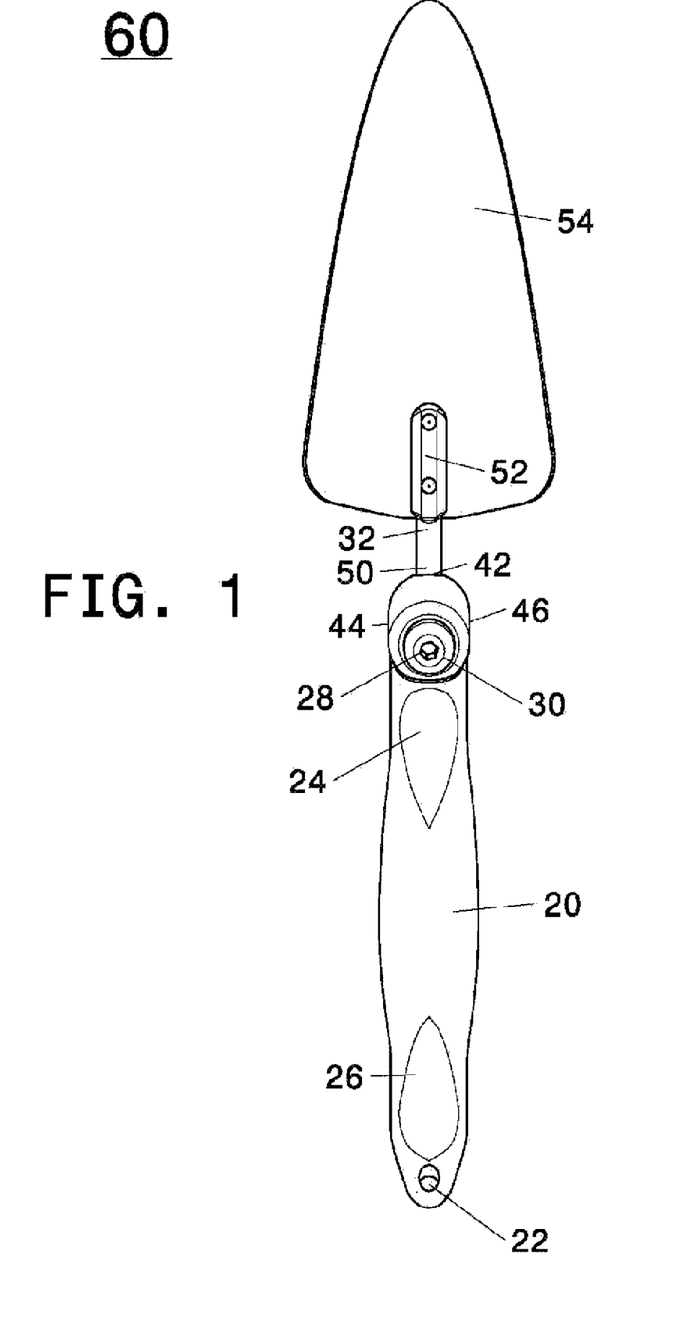
FIG. 1 is a top view of a preferred embodiment where the handle is positioned behind the blade.
Figure 2:
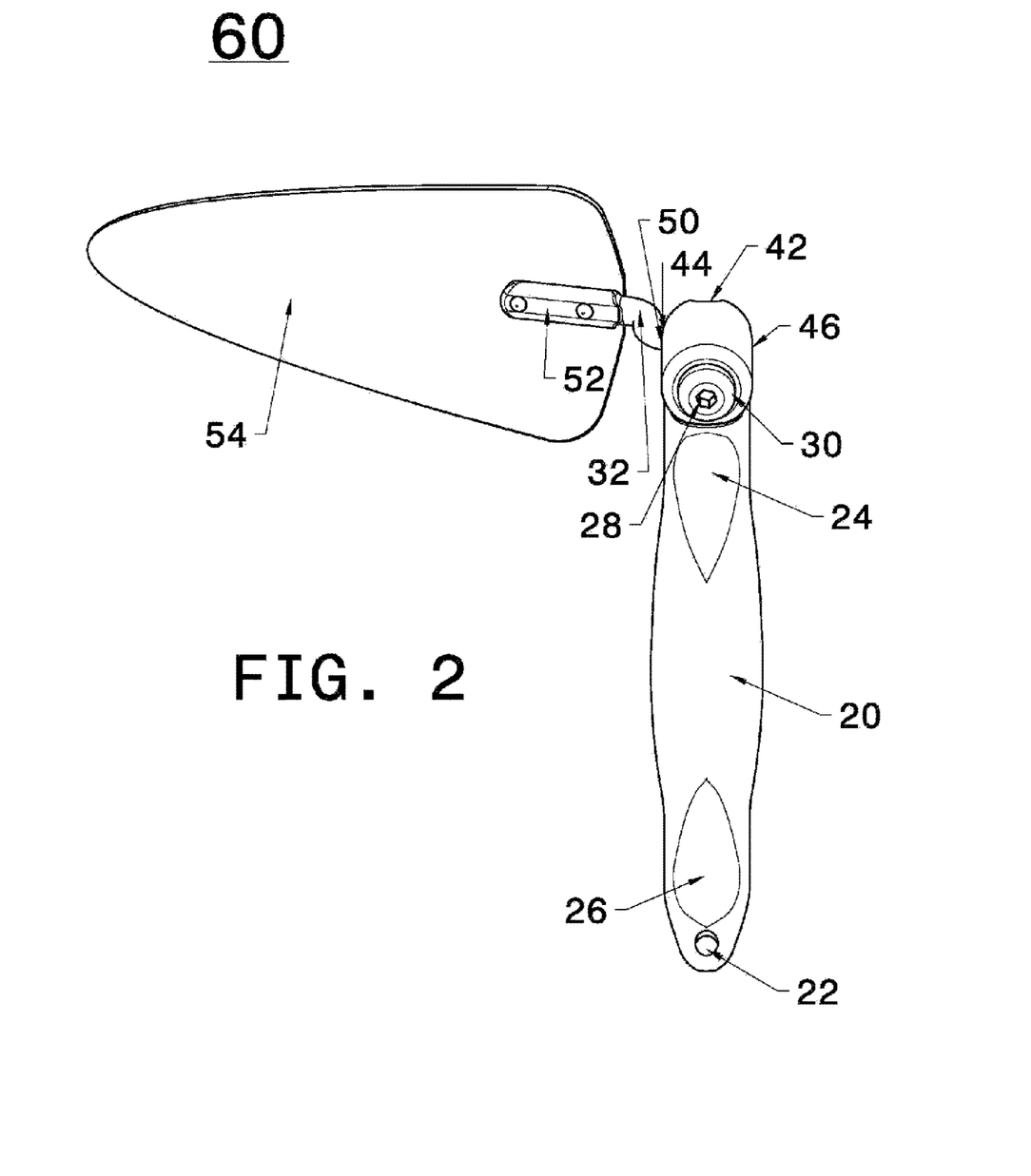
FIG. 2 is a top view of a preferred embodiment where the blade is positioned perpendicular to the handle where the blade points left in relation to the handle.
Figure 3:
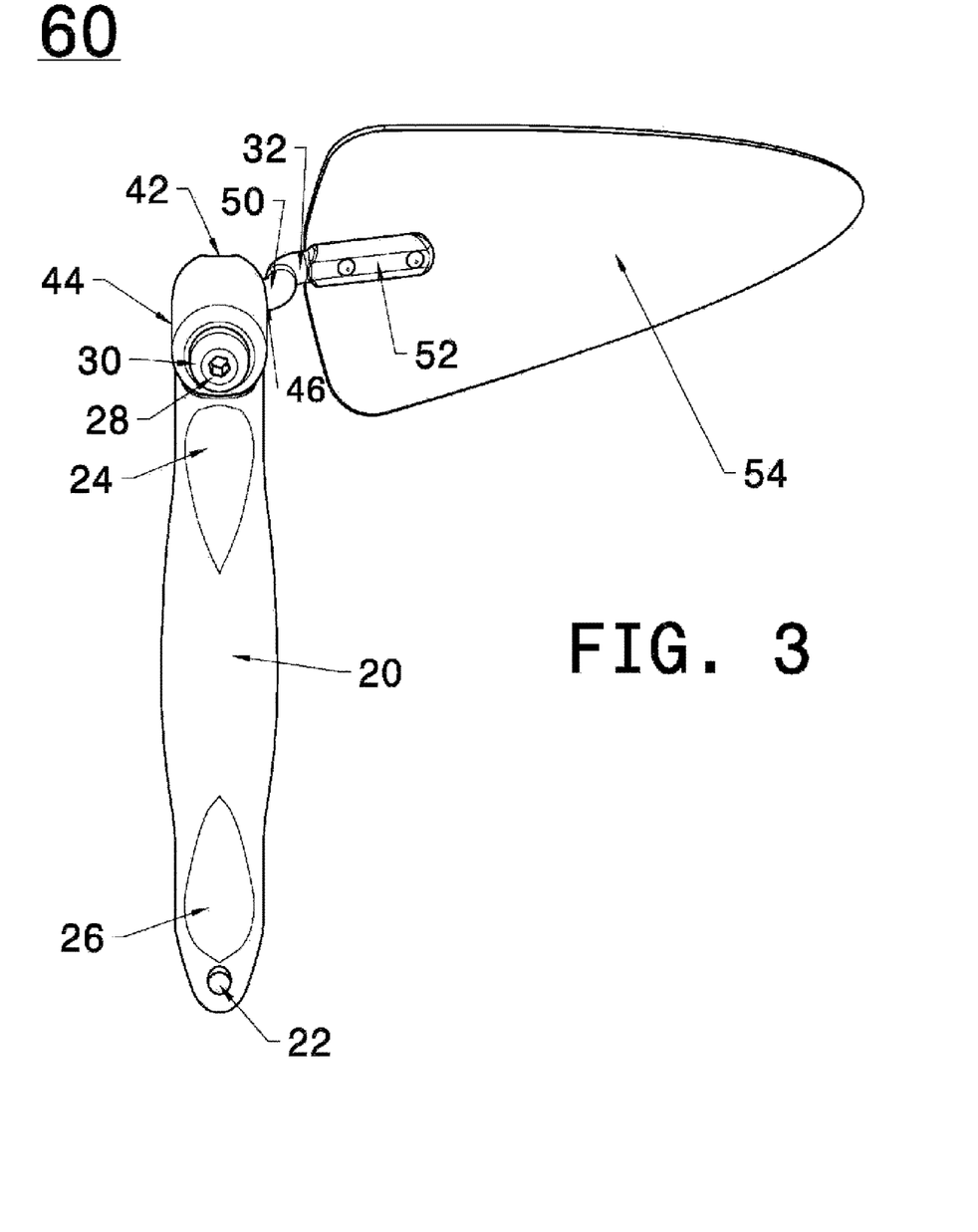
FIG. 3 is a top view of a preferred embodiment where the blade is positioned perpendicular to the handle where the blade points right in relation to the handle.
Figure 4:
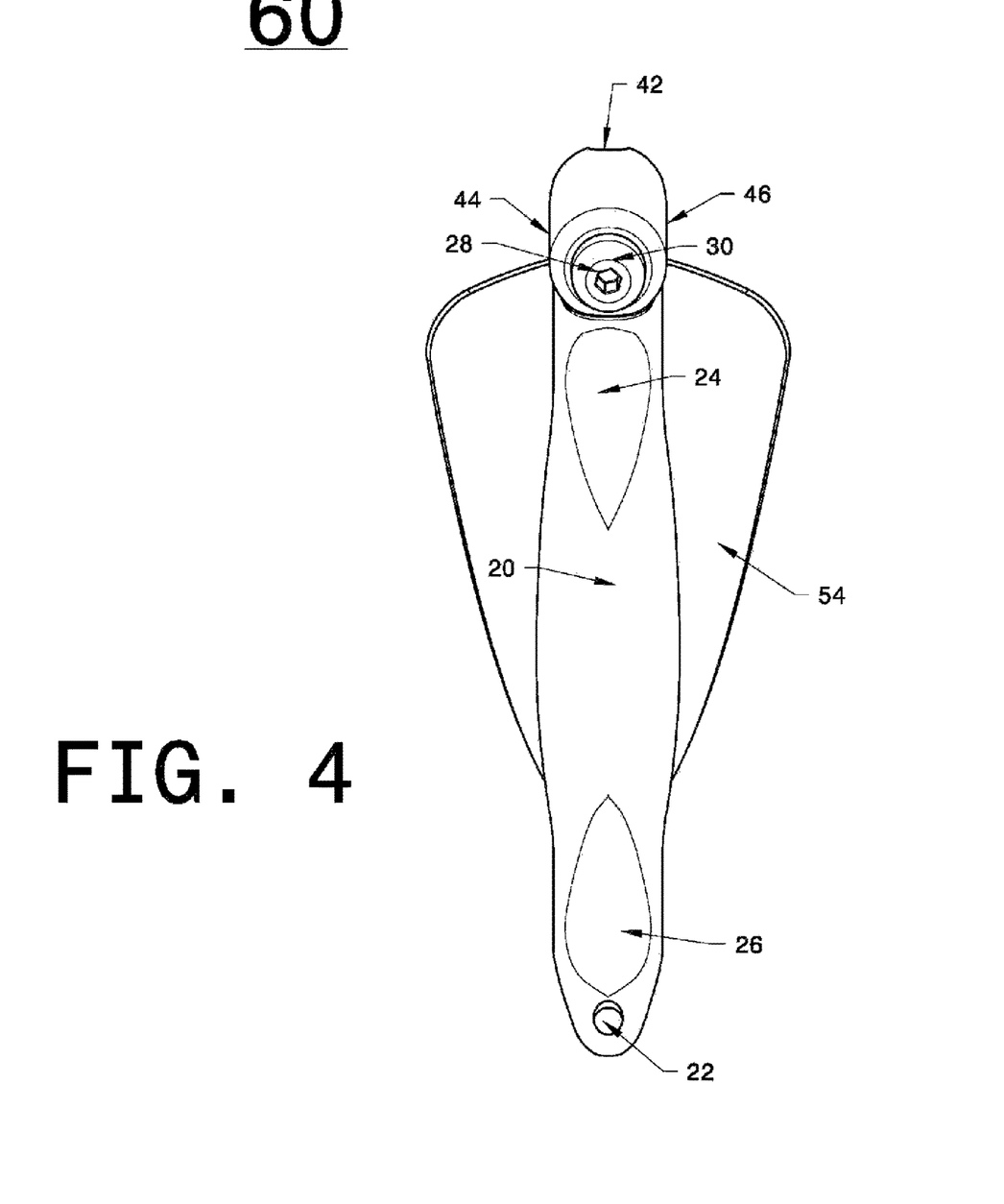
FIG. 4 is a top view of a preferred embodiment where the handle is positioned directly over the blade.
Figure 7:
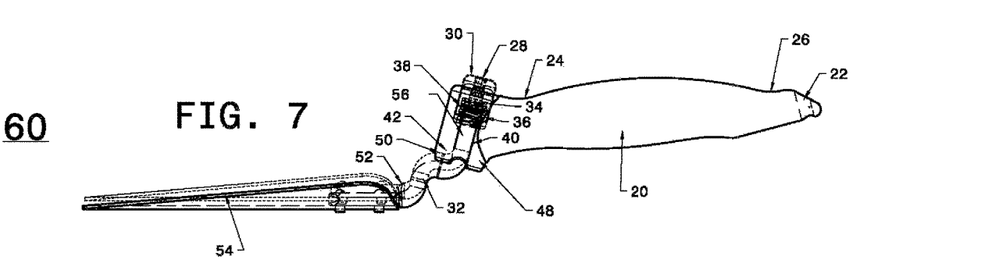
FIG. 7 is a side interior view of a preferred embodiment where the blade is unlocked from the handle as the neck separates from the interlocking groove.
Figure 14:
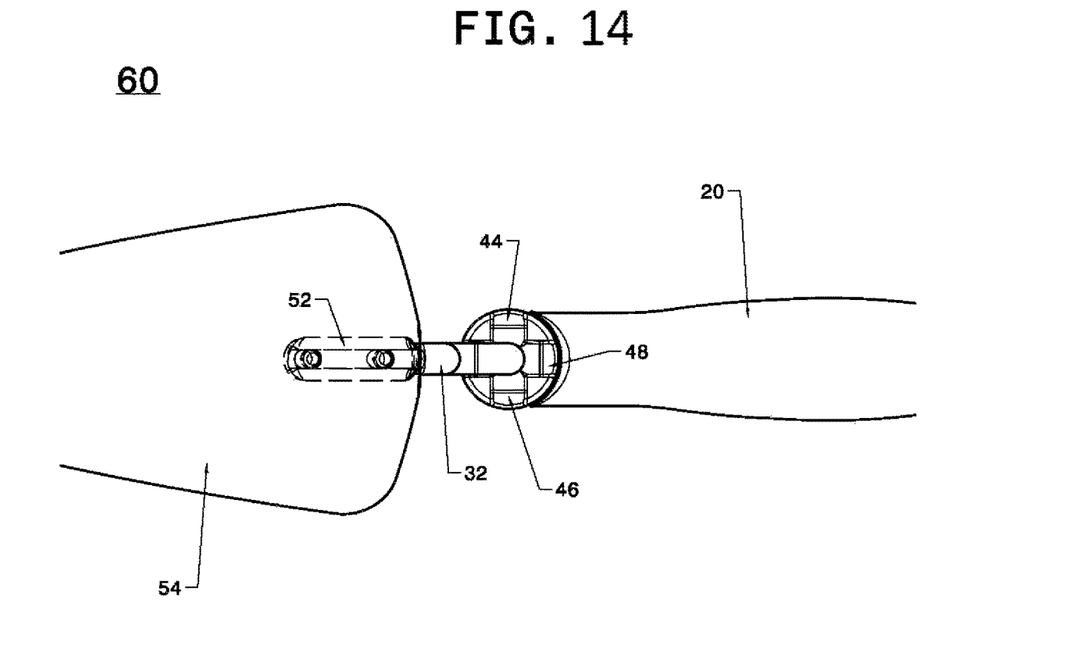
FIG. 14 is a bottom interior view of a preferred embodiment where the handle is locked and where the handle is in line with the blade.

In some preferred embodiments, the adjustable fastener system connecting the handle to the blade may be configurable to allow the handle to occupy four positions relative to the blade, as shown in FIGS. 1, 2, 3, and 4. FIG. 1 illustrates a configuration where the blade is positioned directly in front of the handle. FIG. 2 illustrates a configuration where the blade is positioned perpendicular to the handle where the blade points left in relation to the handle. FIG. 3 illustrates a configuration where the blade is positioned perpendicular to the handle where the blade points right in relation to the handle. FIG. 4 illustrates a configuration where the blade is positioned directly underneath the handle. The blade may be configured in any of these configurations by pressing downward on the actuator to displace the actuator into the internal chamber, as shown in FIG. 7, and thereby displace the threaded male extension and the rest of the neck downward by the same distance that the actuator is displaced. In some embodiments, the actuator may be displaced approximately 1/50 mm. Displacement of the actuator may dislodge the neck locking ridge from the position locking groove. Where the adjustable hand trowel is configured to allow the handle to occupy four positions relative to the blade, the handle may further comprise position locking grooves 42, 44, 46, and 48, as shown in FIG. 14. In this configuration, the position locking grooves may be configured in 90 degree intervals around the opening of the internal shaft. Position locking groove 42 corresponds to the blade-handle configuration where the blade is positioned directly in front of the handle, as shown in FIG. 1. Position locking groove 44 corresponds to the blade-handle configuration where the blade is positioned perpendicular to the handle where the blade points left in relation to the handle, as shown in FIG. 2. Position locking groove 46 corresponds to the blade-handle configuration where the blade is positioned perpendicular to the handle where the blade points right in relation to the handle, as shown in FIG. 3. Position locking groove 48 corresponds to the blade-handle configuration where the blade is positioned directly underneath the handle, as shown in FIG. 4.

Figure 8:
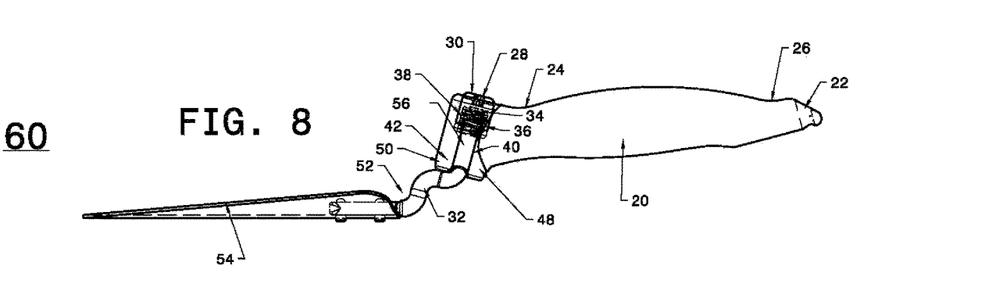
FIG. 8 is a side interior view of a preferred embodiment where the blade is separated from the handle and may be freely rotated.
Figure 9:
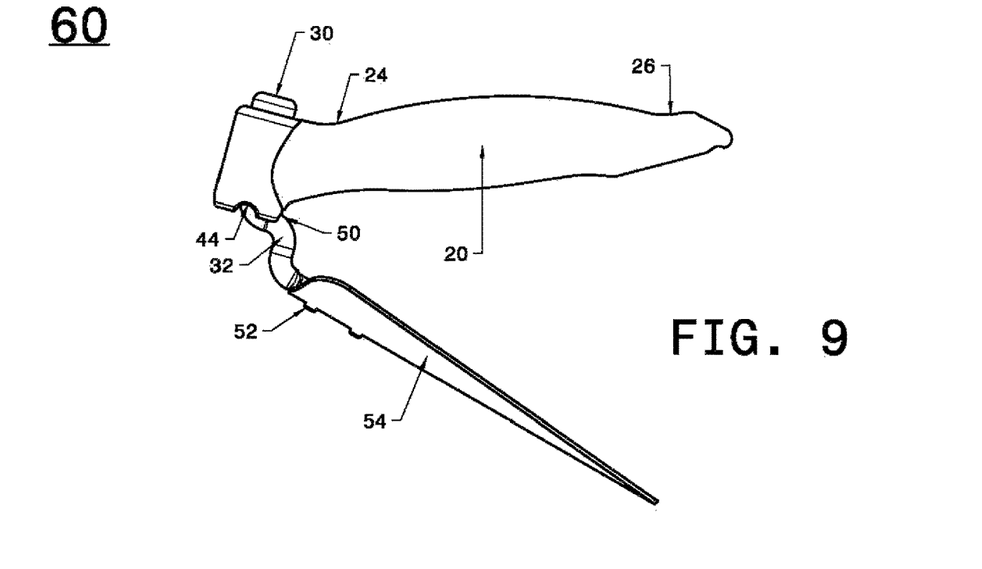
FIG. 9 is a side view of a preferred embodiment where the blade is positioned directly beneath the handle.
Figure 10:
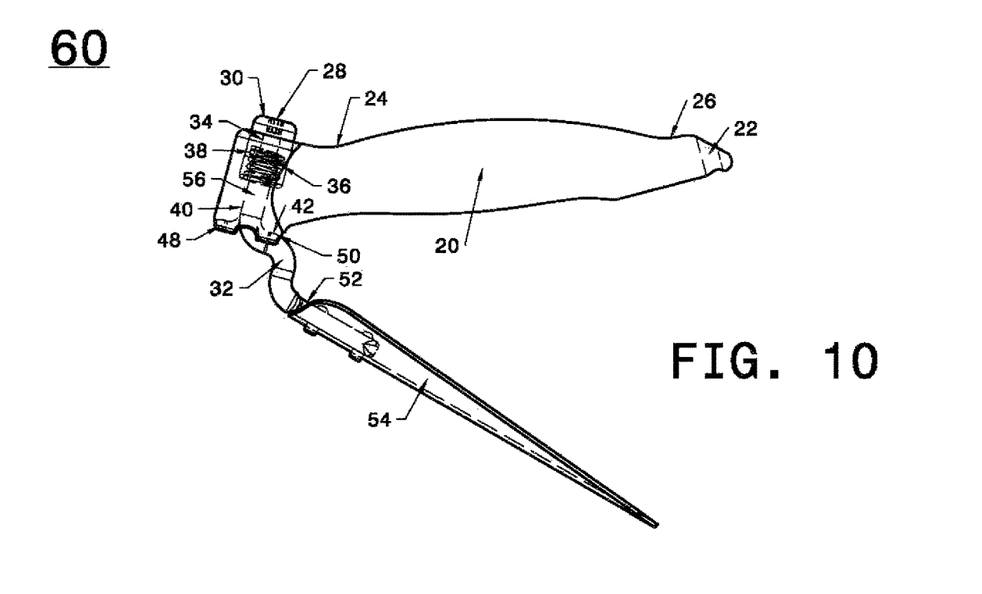
FIG. 10 is a side interior view of a preferred embodiment where the neck is secured into the handle groove and where the blade is positioned directly beneath the handle.
Figure 11:
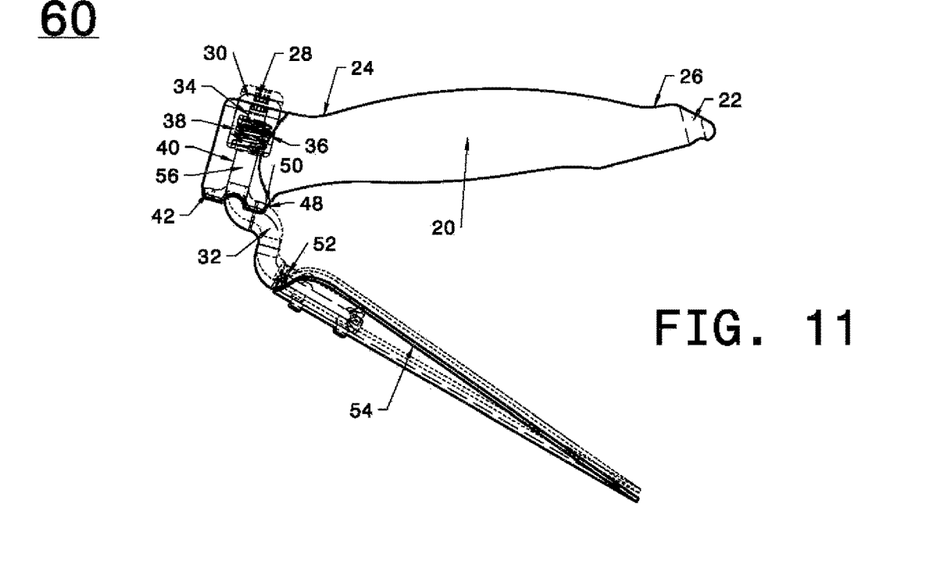
FIG. 11 is a side interior view of a preferred embodiment where the blade is unlocked from the handle as the neck separates from the interlocking groove.
Figure 12:
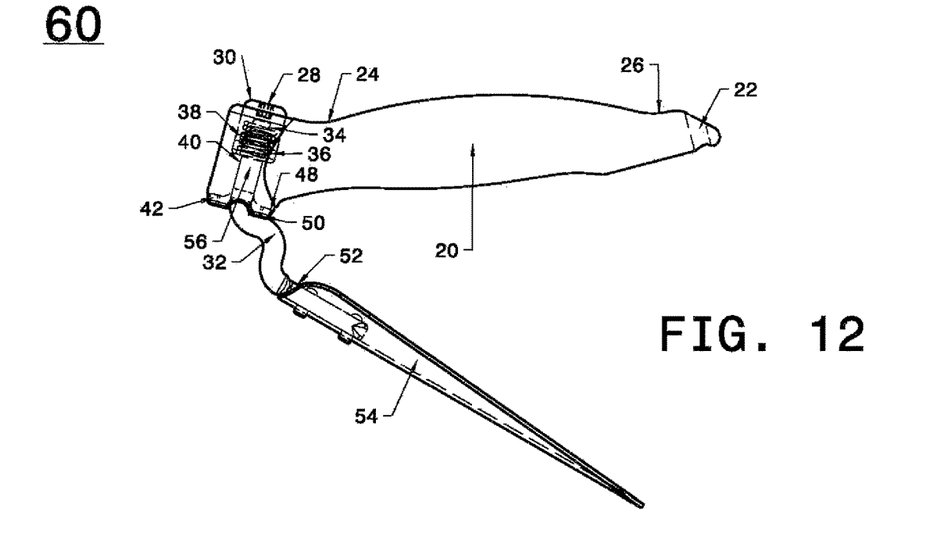
FIG. 12 is a side interior view of a preferred embodiment where the blade is directly beneath the handle but is separated from the handle and is thereby capable of being freely rotated.

When the neck locking ridge is fully disengaged from a position locking groove the blade is free to be rotated into another position. When the neck locking ridge is aligned with a new position locking groove, the user may release the actuator to reengage the neck locking ridge with the new position locking groove, as shown in FIG. 8. This allows the blade to be used in the new position.

The adjustable hand trowel disclosed herein allows a user to exert equal force on the hand trowel as may be exerted on a conventional non-adjustable hand trowel. Thus the disclosed adjustable hand trowel is suitable for digging and other applications which require exertion of significant force by the user on the hand trowel. The adjustable fastener system provides a secure method of fastening the blade-neck assembly to the handle, wherein the blade-handle configuration is able to withstand forces typically exerted during use of a trowel for digging and wherein the user may readily dig in confined spaces. The disclosed adjustable hand trowel may further allow a user to adjust the relative position of the blade-neck assembly and handle using an adjustable fastener system that may be operated using one hand. The adjustable hand trowel may thereby allow the user to dig in an ergonomic and efficient manner in applications that would not be suitable for ergonomic and efficient digging using a conventional non-adjustable hand trowel.

Moreover, it is well known in the art that digging while pulling material toward one's body is more ergonomic and causes less strain and fatigue than digging while shoveling material away from one's body. See, e.g., www.easydigging.com/how-to/use-grub-hoe.html. The configuration shown in FIGS. 4 and 9-13 where the handle is positioned directly over the blade allows the user to dig while pulling material toward the user's body, thereby providing causing less user strain and fatigue than use of a traditional hand trowel for digging.

The handle, blade-neck assembly, and adjustable fastener system may be provided as separate components that may be readily assembled by the user, wherein the handle, blade-neck assembly, and adjustable fastener system are components of an adjustable hand trowel system. The adjustable hand trowel system may comprise multiple blade-neck assemblies for different applications. The adjustable hand trowel system may further comprise multiple handles for different applications.

The previous description of the disclosed embodiments is provided to enable any person skilled in the art to make or use the invention disclosed herein. Various modifications to these embodiments will be readily apparent to those skilled in the art, and the generic principles defined herein may be applied to other embodiments without departing from the spirit or scope of the disclosure. For example, various modifications may be made to the materials used, the selection of components used, the configuration of various components, and the interaction between components. Thus, the present disclosure is not intended to be limited to the embodiments shown herein but is to be accorded the widest scope consistent with the principles and novel features disclosed herein. All references cited herein are expressly incorporated by reference.

What is claimed is:

1. An adjustable hand trowel comprising:
   a. a handle;
   b. a blade-neck assembly comprising a blade and a neck; and
   c. an adjustable fastener system that fastens the handle to the blade-neck assembly;
   wherein the handle and neck comprise adjustment elements that interface with the adjustable fastener system to allow the user to readily adjust and secure the blade-neck assembly in various positions in relation to the handle; and
   wherein the neck comprises a neck seat, a neck locking ridge, and a proximal extension, wherein the proximal extension comprises a threaded male extension.

2. The adjustable hand trowel of claim 1 wherein the handle comprises an opening at its distal end, wherein the opening opens into an internal chamber at the top of the handle and opens into an internal shaft at the bottom of the handle, and wherein the opening at the end of the internal chamber that is interior to the handle and the opening at the end of the internal shaft that is interior to the handle are coincident.

3. The adjustable hand trowel of claim 2 wherein the adjustable fastener system comprises an actuator.

4. The adjustable hand trowel of claim 3 wherein the actuator comprises an inner part that contacts the neck and an outer part that may be operated by the user, wherein the inner part of the actuator comprises female threads.

5. The adjustable hand trowel of claim 4 wherein the adjustable fastener system further comprises a spring.

6. The adjustable hand trowel of claim 5 wherein the spring contacts the proximal end of the threaded male extension, wherein one end of the spring is positioned at the interior end of the internal chamber and the other end of the spring contacts the end of the inner part of the actuator.

7. The adjustable hand trowel of claim 3 wherein the handle further comprises one or more position locking grooves.

8. The adjustable hand trowel of claim 4 wherein the outer part of the actuator comprises a wrench head that allows the actuator to be tightened onto the threaded male extension of the neck.

* * * * *